United States Patent
Rahman et al.

(10) Patent No.: US 9,882,743 B2
(45) Date of Patent: Jan. 30, 2018

(54) CLOUD BASED POWER MANAGEMENT OF LOCAL NETWORK DEVICES

(71) Applicant: SAMSUNG ELECTRONICS CO., LTD., Suwon, Gyeonggi-do (KR)

(72) Inventors: Mahfuzur Rahman, San Jose, CA (US); Glen Stone, Los Gatos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 243 days.

(21) Appl. No.: 13/975,005

(22) Filed: Aug. 23, 2013

(65) Prior Publication Data

US 2014/0173304 A1    Jun. 19, 2014

Related U.S. Application Data

(60) Provisional application No. 61/737,235, filed on Dec. 14, 2012.

(51) Int. Cl.
*G06F 1/32* (2006.01)
*H04L 12/64* (2006.01)
*H04W 52/02* (2009.01)

(52) U.S. Cl.
CPC ........ *H04L 12/6418* (2013.01); *G06F 1/3209* (2013.01); *H04W 52/0212* (2013.01); *Y02B 60/50* (2013.01)

(58) Field of Classification Search
CPC ..... G06F 1/32; G06F 1/3209; H04L 12/6418; H04W 52/0212
See application file for complete search history.

(56) References Cited

U.S. PATENT DOCUMENTS

| 2005/0233780 A1 | 10/2005 | Jani et al. |
| 2006/0075100 A1* | 4/2006 | Stirbu ........................ 709/225 |
| 2006/0075269 A1 | 4/2006 | Liong et al. |
| 2009/0172163 A1* | 7/2009 | Carroll ................... H04L 12/12 709/226 |
| 2011/0184585 A1 | 7/2011 | Matsuda et al. |

(Continued)

FOREIGN PATENT DOCUMENTS

| CN | 1416629 A | 5/2003 |
| CN | 101785247 A | 7/2010 |

(Continued)

OTHER PUBLICATIONS

International Search Report and Written Opinion dated Mar. 11, 2014 for International PCT Application No. PCT/KR2013/011131 from International Application Division, Korean Intellectual Property Office, pp. 1-9, Daejeon, Republic of Korea.

(Continued)

*Primary Examiner* — Thomas Lee
*Assistant Examiner* — Vincent Chang
(74) *Attorney, Agent, or Firm* — Sherman IP LLP; Kenneth L. Sherman; Hemavathy Perumal

(57) ABSTRACT

A method for power management comprises registering and subscribing one or more endpoint devices to a remote power management service. The one or more endpoint devices are connected with a local network. Power state information of the one or more endpoint devices is obtained. Power state of one or more endpoint devices is changed using the remote power management service.

30 Claims, 8 Drawing Sheets

(56) References Cited

U.S. PATENT DOCUMENTS

2012/0117149 A1   5/2012  Nagpal et al.
2012/0271472 A1*  10/2012 Brunner et al. ............. 700/295

FOREIGN PATENT DOCUMENTS

CN   102204226 A     9/2011
JP    2006025474 A    1/2006
KR   1020030071903 A1  9/2003

OTHER PUBLICATIONS

Extended European Search Report dated Jun. 20, 2016 for European Application No. 13862712.0 from European Patent Office, pp. 1-7, Munich, Germany.
Chinese Office Action dated Apr. 28, 2017 for Chinese Patent Application No. 201380064807.5 from China Patent Office, pp. 1-19, Beijing City, China (English-language translation included pp. 1-11).

* cited by examiner

CLOUD BASED POWER MANAGEMENT OF LOCAL NETWORK DEVICES

CROSS-REFERENCE TO RELATED APPLICATIONS

This application claims the priority benefit of U.S. Provisional Patent Application Ser. No. 61/737,235, filed Dec. 14, 2012, incorporated herein by reference in its entirety.

TECHNICAL FIELD

One or more embodiments relate generally to power management of electronic device and, in particular, to low power management of local network devices via a cloud service.

BACKGROUND

Power management is a feature of a device. Such as a portable electronic device, where the device uses low power modes to reduce power consumption. Universal Plug and Play (UPnP) Low Power provides a mechanism for low power management, but requires a device to be located in a home network to act as a proxy and manage low power capable devices.

SUMMARY

One or more embodiments relate generally to using a cloud service or server for providing low power management of electronic devices in a local network. One embodiment provides In one embodiment, a method for power management comprises registering and subscribing one or more endpoint devices to a remote power management service. In one embodiment, the one or more endpoint devices are connected with a local network. In one embodiment, power state information of the one or more endpoint devices is obtained. In one embodiment, power state of one or more endpoint devices is changed using the remote power management service.

Another embodiment comprises a server including a memory for storing power state information, and a service that uses a processor for registering and subscribing one or more endpoint devices connected to a local network. In one embodiment, the service further obtains the power state information of the one or more endpoint devices, and provides power state information to a particular one endpoint device connected to the local network for changing power state of one or more endpoint devices.

One embodiment comprises a computer program product for power management. The computer program product comprising a tangible storage medium readable by a computer system and storing instructions for execution by the computer system for performing a method. The method comprising registering and subscribing one or more endpoint devices to a remote power management service, obtaining power state information by the remote power management service of endpoint devices, and changing power state of one or more endpoint devices connected with the local network using the remote power management service.

These and other aspects and advantages of the one or more embodiments will become apparent from the following detailed description, which, when taken in conjunction with the drawings, illustrate by way of example the principles of one or more embodiments.

BRIEF DESCRIPTION OF THE DRAWINGS

For a fuller understanding of the nature and advantages of the one or more embodiments, as well as a preferred mode of use, reference should be made to the following detailed description read in conjunction with the accompanying drawings, in which.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate generally to providing power management services or a power management server to endpoint devices in a local network (e.g., a home network) from a cloud based computing environment. One embodiment provides power management through cloud based services.

In one embodiment, the endpoint electronic devices may comprise a mobile electronic device capable of data communication over a communication link such as a wireless communication link. Examples of such mobile device include a mobile phone device, a mobile tablet device, smart mobile devices, etc.

In one embodiment, a method provides power management that comprises registering and subscribing one or more endpoint devices to a remote power management service. In one embodiment, the one or more endpoint devices are connected with a local network. In one embodiment, power state information of the one or more endpoint devices is obtained. In one embodiment, power state of one or more endpoint devices is changed using the remote power management service.

One or more embodiments provide power management for local (e.g., home) network devices with the use of a cloud-based service that provides processing in the cloud and at the same time provides a mechanism to minimize power consumption in the devices. In one or more embodiments, providing the cloud-based service for power management removes the dependence for a low power proxy device in the home network in order for the low power devices to enter low power state, or be awakened from a sleep state or mode. One embodiment provides mechanism for devices in the home network to convey power state information to a device or service external to the home network, and provides a mechanism for a device in the home network to receive information about devices that are available in the home network from the cloud but are not advertising themselves in the home network (e.g., the devices are currently in sleep state or mode). One embodiment provides a mechanism for a service or device in the cloud to change the power state of a device in the home network.

Figure 1:
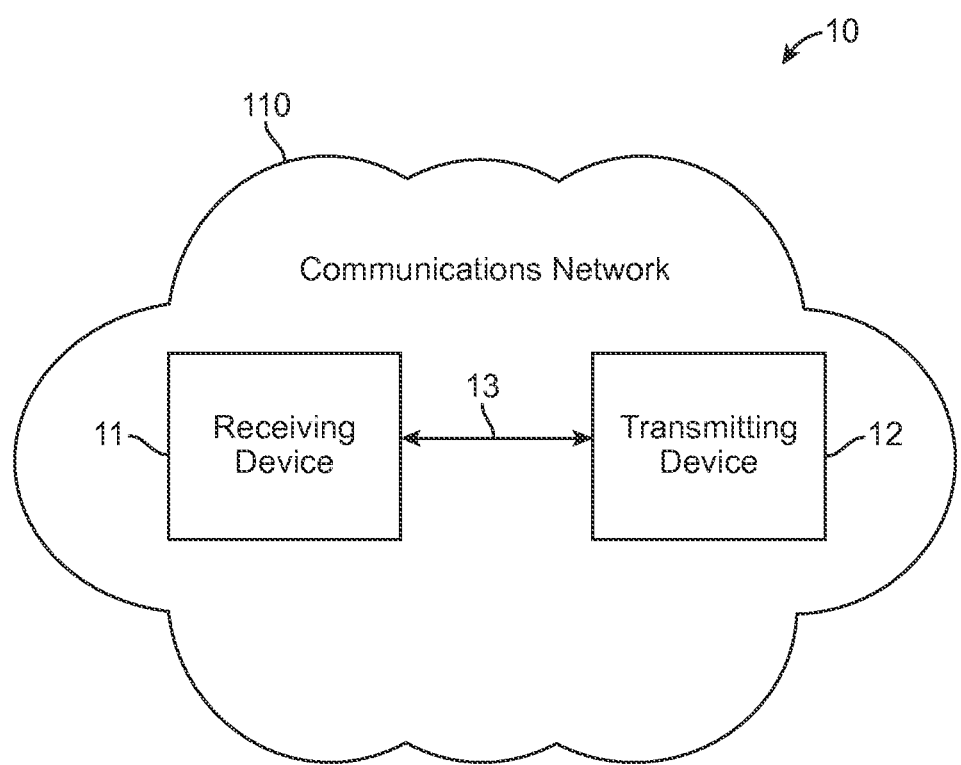
FIG. 1 shows a schematic view of a communications system, according to an embodiment.

FIG. 1 is a schematic view of a communications system in accordance with one embodiment. Communications system 10 may include a communications device that initiates an outgoing communications operation (transmitting device 12) and communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include several transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., a 802.11 protocol), Bluetooth®, high frequency systems (e.g., 900 MHz, 2.4 GHz, and 5.6 GHz communication systems), infrared, other relatively localized wireless communication protocol, or any combination thereof. In some embodiments, communications network 110 may support protocols used by wireless and cellular phones and personal email devices (e.g., a Blackberry®). Such protocols can include, for example, GSM, GSM plus EDGE, CDMA, quadband, and other cellular protocols. In another example, a long range communications protocol can include Wi-Fi and protocols for placing or receiving calls using VoIP or LAN. Transmitting device 12 and receiving device 11, when located within communications network 110, may communicate over a bidirectional communication path such as path 13. Both transmitting device 12 and receiving device 11 may be capable of initiating a communications operation and receiving an initiated communications operation.

Transmitting device 12 and receiving device 11 may include any suitable device for sending and receiving communications operations. For example, transmitting device 12 and receiving device 11 may include a media player, a cellular telephone or a landline telephone, a personal e-mail or messaging device with audio and/or video capabilities, pocket-sized personal computers such as an iPAQ Pocket PC available by Hewlett Packard Inc., of Palo Alto, Calif., personal digital assistants (PDAs), a desktop computer, a laptop computer, and any other device capable of communicating wirelessly (with or without the aid of a wireless enabling accessory system) or via wired pathways (e.g., using traditional telephone wires), a television device, disk players, DVDs, STBs, etc. The communications operations may include any suitable form of communications, including for example, voice communications (e.g., telephone calls), data communications (e.g., e-mails, text messages, media messages), or combinations of these (e.g., video conferences).

Figure 2:
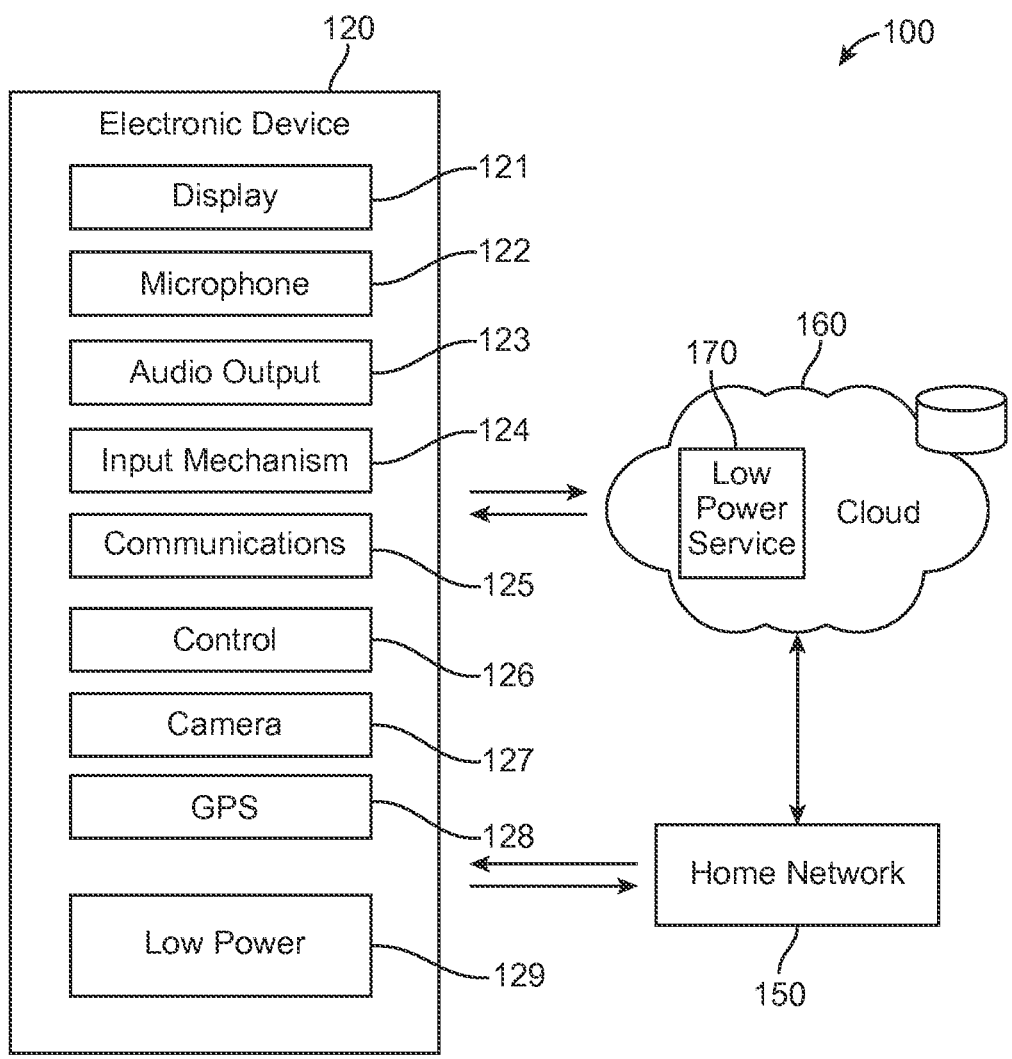
FIG. 2 shows a block diagram of an architecture system for low power management, according to an embodiment.

FIG. 2 shows a functional block diagram of a system 100 including an electronic device 120, according to an embodiment. Both transmitting device 12 and receiving device 11 may include some or all of the features of electronics device 120. In one embodiment, the electronic device 120 may comprise a display 121, a microphone 122, audio output 123, input mechanism 124, communications circuitry 125, control circuitry 126, a camera module 127, a global positioning system (GPS) receiver module 128, a low power module 129, and any other suitable components. In one embodiment, electronic device may comprise mobile or stationary type electronic devices, home network devices, portable devices, etc.

In one embodiment, power state information may be obtained or stored using the low power module 129 or using the cloud or network 160, communications network 110, etc. In one embodiment, the cloud 160 includes a power (management) service 170 that may communicate (e.g., transmit/receive) with the electronic device 120 either directly or via the home or local network 150.

In one embodiment, all of the applications employed by audio output 123, display 121, input mechanism 124, communications circuitry 125 and microphone 122 may be interconnected and managed by control circuitry 126. In one example, a hand held music player capable of transmitting music to other tuning devices may be incorporated into the electronics device 120.

In one embodiment, audio output 123 may include any suitable audio component for providing audio to the user of electronics device 120. For example, audio output 123 may include one or more speakers (e.g., mono or stereo speakers) built into electronics device 120. In some embodiments, audio output 123 may include an audio component that is remotely coupled to electronics device 120. For example, audio output 123 may include a headset, headphones or earbuds that may be coupled to communications device with a wire (e.g., coupled to electronics device 120 with a jack) or wirelessly (e.g., Bluetooth® headphones or a Bluetooth® headset).

In one embodiment, display 121 may include any suitable screen or projection system for providing a display visible to the user. For example, display 121 may include a screen (e.g., an LCD screen) that is incorporated in electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In one embodiment, input mechanism 124 may be any suitable mechanism or user interface for providing user inputs or instructions to electronics device 120. Input mechanism 124 may take a variety of forms, such as a button, keypad, dial, a click wheel, or a touch-screen incorporated with the display 121. The input mechanism 124 may include a multi-touch screen. The input mechanism may include a user interface that may emulate a rotary phone or a multi-button keypad, which may be implemented on a touch-screen or the combination of a click wheel or other user input device and a screen.

In one embodiment, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., a 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VoIP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the Bluetooth® protocol to couple the electronics device 120 with a Bluetooth® headset.

In one embodiment, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, a processor may drive the display and process inputs received from the user interface. The memory and storage may include, for example, cache, Flash memory, ROM, and/or RAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user, power state information, etc.).

In one embodiment, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include an automatic speech recognition (ASR) application, a dialog application, a camera application including a gallery application and an editing application, a calendar application, a contact list application, a map application, a media application (e.g., QuickTime, MobileMusic.app, or Mobi-leVideo.app), etc. In some embodiments, the electronics device 120 may include one or several applications operative to perform communications operations. For example, the electronics device 120 may include a messaging application, a mail application, a telephone application, a voicemail application, an instant messaging application (e.g., for chatting), a videoconferencing application, a fax application, or any other suitable application for performing any suitable communications operation.

In some embodiments, the electronics device 120 may include one or more microphones 122. For example, electronics device 120 may include microphone 122 to allow the user to transmit audio (e.g., voice audio) during a communications operation or as a means of establishing a communications operation or as an alternate to using a physical user interface. Microphone 122 may be incorporated in electronics device 120, or may be remotely coupled to the electronics device 120. For example, microphone 122 may be incorporated in wired headphones, or microphone 122 may be incorporated in a wireless headset. In one embodiment, the electronic device 120 includes a front microphone 122 and a rear microphone 122. In one embodiment, the front and rear microphones 122 may be used one at a time or simultaneously.

In one embodiment, the electronics device 120 may include any other component suitable for performing a communications operation. For example, the electronics device 120 may include a power supply, ports or interfaces for coupling to a host device, a secondary input mechanism (e.g., an ON/OFF switch), or any other suitable component.

In one embodiment, a user may direct electronics device 120 to perform a communications operation using any suitable approach. As one example, a user may receive a communications request from another device (e.g., an incoming telephone call, an email or text message, an instant message), and may initiate a communications operation by accepting the communications request. As another example, the user may initiate a communications operation by identifying another communications device and transmitting a request to initiate a communications operation (e.g., dialing a telephone number, sending an email, typing a text message, or selecting a chat screen name and sending a chat request).

In one embodiment, the GPS receiver module 128 may be used to identify a current location of the mobile device (i.e., user). In one embodiment, a compass module is used to identify direction of the mobile device, and an accelerometer and gyroscope module is used to identify tilt of the mobile device. In other embodiments, the electronic device may comprise a stationary electronic device, such as a television or television component system.

In one embodiment, the electronic device may comprise multiple cameras (e.g., a front/facing camera, a rear/opposing camera, etc.) that interoperate with the camera module 127 for providing image capturing settings, editing functionality, image storing and sharing functionality, etc.

Figure 3:
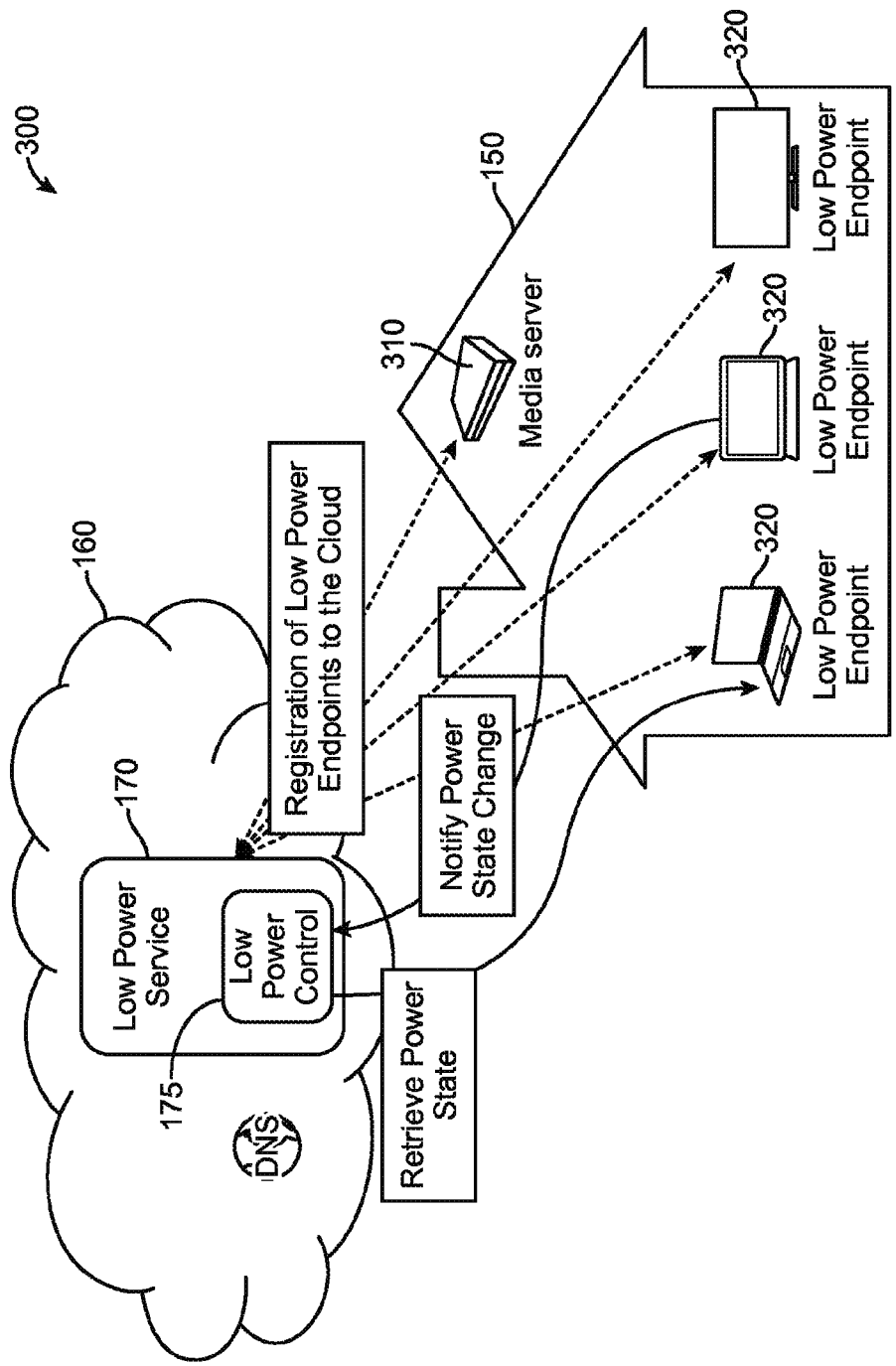
FIG. 3 shows an example scenario for low power management services provided via a cloud to a local network, according to an embodiment.

FIG. 3 shows an example scenario 300 for a power or low power (management) service 170 provided via a cloud 160 to a local network 150, according to an embodiment. In one embodiment, the local network 150 (e.g., a home network) comprises multiple endpoint electronic devices 320 (e.g., local endpoints). In one embodiment, a media server 310 is also included in the local network 150. In one embodiment, the endpoint electronic devices 320 and media server 310 discover the power service 170 in the cloud 160. In one embodiment, the power service 170 is associated with a uniform resource link (URL) that may be statically configured in the endpoint electronic devices 320 and media server 310 and any other endpoints or control points that belong to the local network 150.

In one embodiment, a low power control point may be employed to retrieve power state information from the power service 170 in the cloud 160 or from the endpoint electronic devices 320 and media server 310. In one embodiment, the power service 170 may include a low power control point 175 and obtain power state information from the endpoint electronic devices 320 and media server 310 in the local network 150. In one embodiment, the low power control points may also receive power state action information (e.g., change of power state or mode) from the endpoint electronic devices 320 and media server 310 (e.g., low power endpoints) when the power state or mode of the endpoint electronic devices 320 and media server 310 changes (e.g., between an active state or mode to a sleep state or mode, etc.).

In one embodiment, the power service 170 in the cloud 160 may be locally advertised on its behalf by any other devices in the home network, e.g., a CDS. In one example embodiment, all the location information in an advertisement document must include the URL of the power service 170 in the cloud 160.

In one embodiment, the power service 170 may be discovered by employing a domain name system (DNS) based service discovery or any other wide area service discovery mechanism.

In one embodiment, the power service 170 registers and subscribes the endpoint devices (e.g., electronic devices 320, media server 310, etc.) in the local network 150. In one embodiment, if it is desired that the endpoint devices in the local network 150 use the power service 170, the endpoint devices register with the power service 170 in the cloud 160. In one embodiment, the power service 170 provides a registration and subscription action for the endpoint devices in the local network 150. In one embodiment, the power service 170 may discover the local network 150 endpoints as a registration action. In this embodiment, advertisement of the local network 150 endpoints to the cloud 160 is required for the power service 170.

In one embodiment, a low power endpoint device (e.g., the media server 310, the electronic devices 320, etc.) in the local network 150 may notify the power state information of the device to the power service 170 in the cloud 160 by using a universal plug and play (UPnP) eventing mechanism. In one embodiment, a low power control point 175 may retrieve power state information from the local network 150 devices by invoking an action. In one embodiment, the power service 170 obtains power state information from all the registered low power endpoints in the local network 150.

In one embodiment, upon a low power endpoint changing its power state, the low power endpoint notifies the change of state information to the power service 170 in the cloud 160.

In one embodiment, a local network 150 electronic device uses the power service 170 in the cloud 160 in order to locate an electronic device that may be in a sleep state or mode. In one embodiment, if the power service 170 obtained the power state information about that endpoint device, the local network 150 devices may wake the endpoint device based on the information provided by the power service 170.

Figure 4:
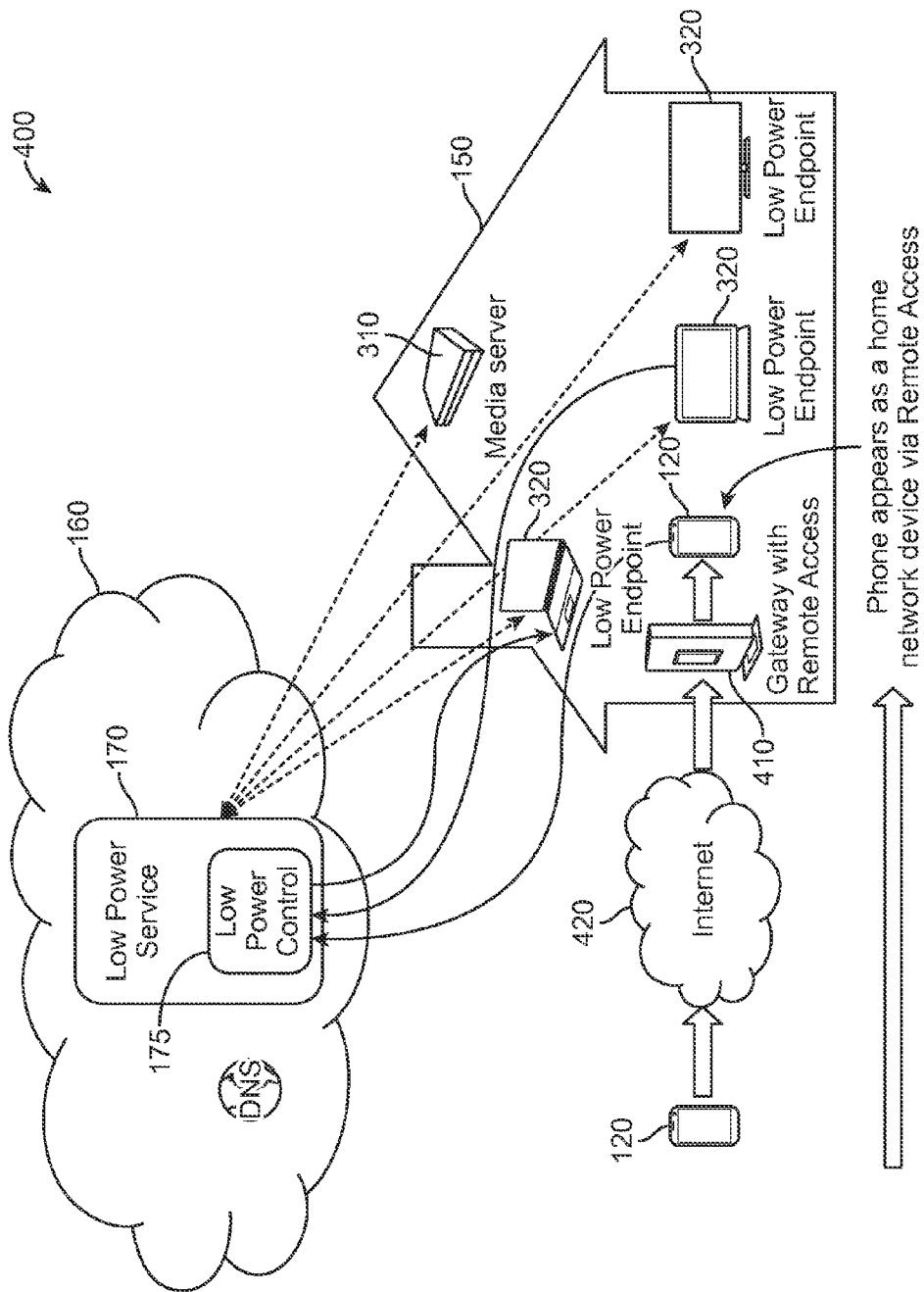
FIG. 4 shows another example scenario for low power management services provided via a cloud to a local network, according to an embodiment.

FIG. 4 shows another example scenario 400 for the power (management) service 170 provided via the cloud 160 to the local network 150, according to an embodiment. In one embodiment, remote devices, such as mobile devices, may access the local network 150 through a medium (e.g., Internet 420) while endpoint devices on the local network 150 may be in a low power state or mode. In one embodiment, a mobile device 120 uses the Internet 420 to access a gateway 410 for the local network 150. In one embodiment, mobile devices may use remote access techniques, for example, digital living network alliance (DLNA) remote access guidelines, virtual private network (VPN), etc., to become part of the local network 150.

In one embodiment, the remote access device 120 must support UPnP lower power and include the capability to access the power service 170 in the cloud 160, just as the local network 150 endpoint devices are required to support. In one embodiment, the remote device 120 may discover and wake up the local network 150 endpoint devices just as if it were physically on the local network 150.

Figure 5:
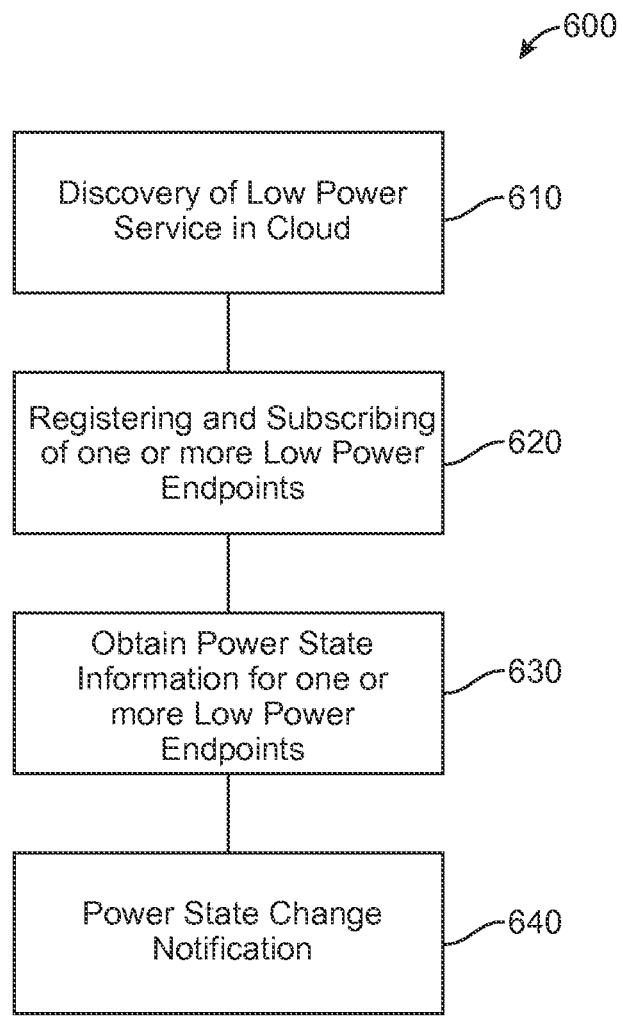
FIG. 5 shows a flowchart of a process for cloud based low power management of a local network, according to an embodiment.

FIG. 5 shows a flowchart of a process 600 for cloud based low power management (e.g., using a service or server) for a local network, according to an embodiment. In one embodiment, in process block 610 discovery is provided for a low power management service (e.g., power service 170, FIGS. 3 and 4) by endpoint devices (e.g., media server 310, electronic devices 320, etc.) connected with a local/home network (e.g., local network 150). In one embodiment, discovery comprises one or more of: statically configuring the endpoint devices with a link to the low power management service, advertising the low power management service using a particular device connected to the local network, and using a wide area service discovery mechanism by the endpoint devices to discover the low power management service.

In one embodiment, process block 620 comprises registering and subscribing one or more endpoint devices to the low power management service. In one embodiment, registering and subscribing comprises one or more of: providing subscription and registration by the low power management service for registering endpoint devices, and registration may comprise discovering by the low power management service of endpoint devices advertised to the low power management service.

In one embodiment, process block 630 comprises obtaining power state information by the low power management service of registered and subscribed endpoint devices. In one embodiment, obtaining power state information comprises one or more of: receiving notification of the power state information by the low power management service from one or more endpoint devices, retrieving the power state information by the low power management service from the one or more endpoint devices using an action, and receiving the power state information from a control point connected to the local network.

In one embodiment, process block 640 comprises changing power state of one or more endpoint devices connected with the local network using the low power management service. In one embodiment, changing power state of one or more endpoint devices comprises: providing information by the low power management service for one or more devices that are in low power state to one or more active state devices, and changing the state of the one or more devices in the low power state to an active state.

In one embodiment, the low power management service comprises a cloud-based service. In one embodiment, the power state information is pulled from the local network or pushed to a cloud network.

Figure 6:
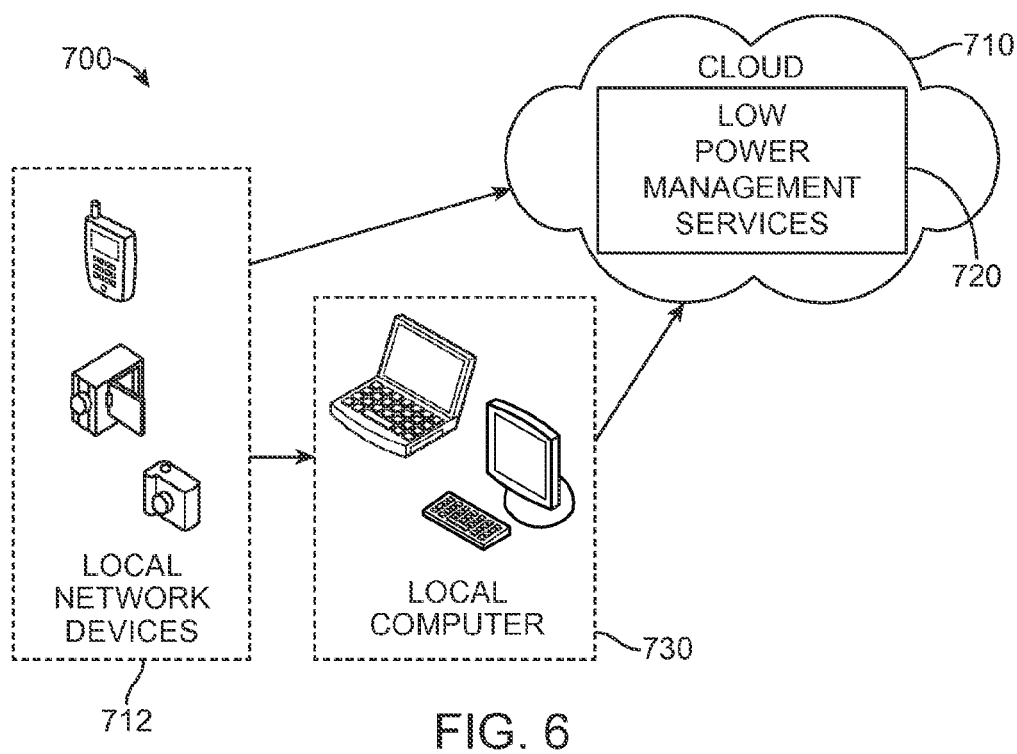
FIG. 6 shows a computing environment for implementing an embodiment.
Figure 7:
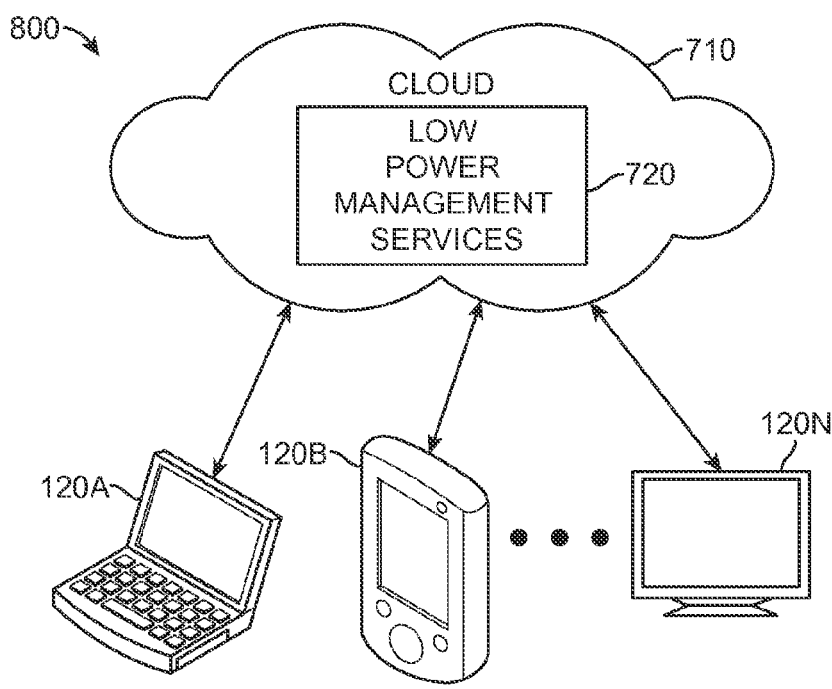
FIG. 7 shows a computing environment for implementing an embodiment.

FIGS. 6 and 7 illustrate examples of networking environments 700 and 800 for cloud computing in which low power management embodiments described herein may utilize. In one embodiment, in the environment 700, the cloud 710 provides services 720 (such as low power management services, networking services, among other examples) for user computing devices, such as local network electronic devices 712 (e.g., similar to electronic device 120). In one embodiment, services may be provided in the cloud 710 through cloud computing service providers, or through other providers of online services. In one example embodiment, the cloud-based services 720 may include low power management processing and services that uses any of the techniques disclosed, an information storage service, a networking site, or other services via which user electronic device information is stored and distributed to connected devices.

In one embodiment, various electronic devices 712 include mobile or stationary electronic devices, image or video capture devices to capture one or more images or video, etc. In one embodiment, the electronic devices 712 may provide low power information to the service 720 on the cloud 710 either directly (e.g., using a data transmission service of a telecommunications network) or by first transferring the information to a local computer 730, such as a personal computer, mobile device, wearable device, or other network computing device.

In one embodiment, as shown in environment 800 in FIG. 7, cloud 710 may also be used to provide services that include low power management embodiments to connected electronic devices 120A-120N that may have a variety of screen display sizes. In one embodiment, electronic device 120A represents a device with a mid-size display screen, such as what may be available on a personal computer, a laptop, or other like network-connected device. In one embodiment, electronic device 120B represents a device with a display screen configured to be highly portable (e.g., a small size screen). In one example embodiment, electronic device 120B may be a smartphone, PDA, tablet computer, portable entertainment system, media player, wearable device, or the like. In one embodiment, electronic device 120N represents a connected device with a large viewing screen. In one example embodiment, electronic device 120N may be a television screen (e.g., a smart television) or another device that provides image output to a television or an image projector (e.g., a set-top box or gaming console), or other devices with like image display output. In one embodiment, the electronic devices 120A-120N may further include image capturing hardware. In one example embodiment, the electronic device 120B may be a mobile device with one or more image sensors, and the electronic device 120N may be a television coupled to an entertainment console having an accessory that includes one or more image sensors.

In one or more embodiments, in the cloud-computing network environments 700 and 800, any of the embodiments may be implemented at least in part by cloud 710. In one embodiment example, low power management techniques are implemented in software on the local computer 730, one of the electronic devices 120, and/or electronic devices 120A-N. In another example embodiment, the low power management techniques are implemented in the cloud and used to manage the local network devices 120A-120N without a proxy device in the local network.

In one or more embodiments, low power management information is shared across one or more platforms from an electronic device 120. Typically, low power management control is only available within a local network. In one embodiment, low power management services may be provided to multiple electronic devices 120 and shared across multiple networks.

Figure 8:
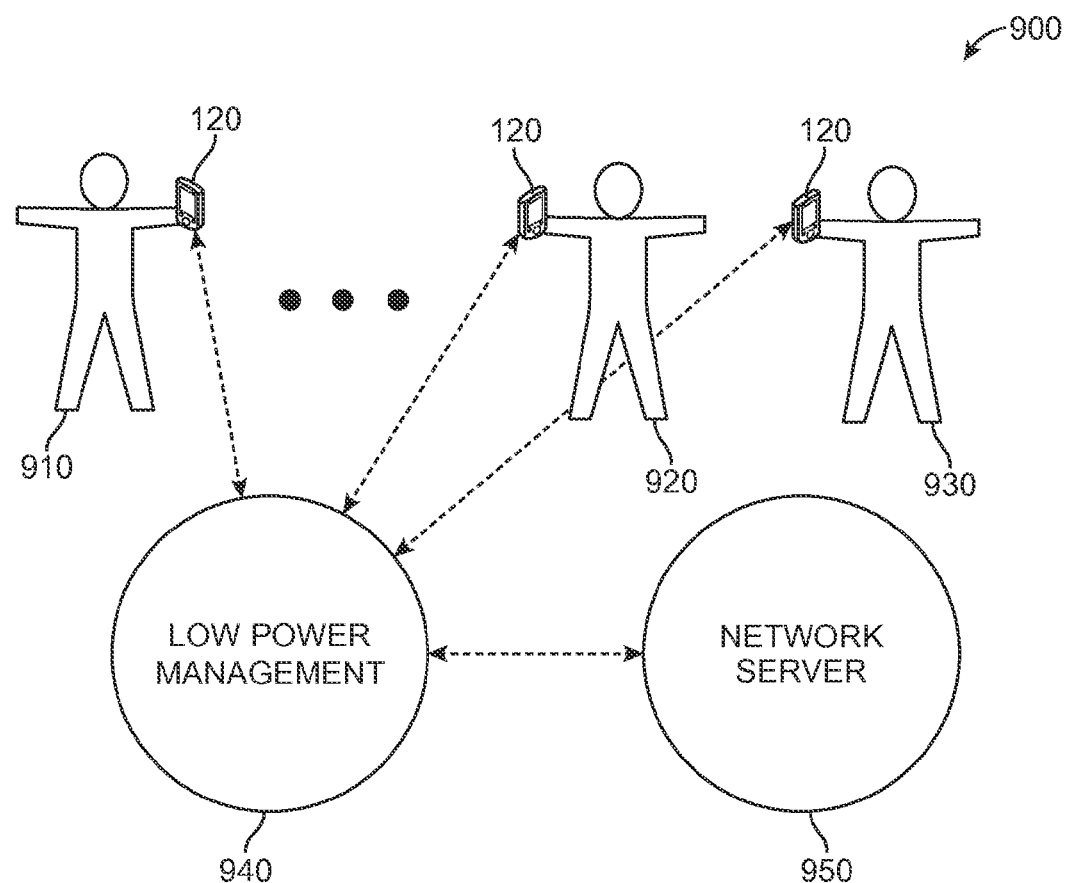
FIG. 8 shows a computing environment for providing low power management service, according to an embodiment.

FIG. 8 is a block diagram 900 illustrating example users of a low power management system according to an embodiment. In one embodiment, users 910, 920, 930 are shown, each having a respective electronic device 120 that is capable of providing low power information (e.g., power mode, power state, etc.). In one embodiment, the electronic devices 120 are configured to communicate with a low power management controller 940, which is may be a remotely-located server or cloud. In one embodiment where the low power management controller 940 is a remotely-located server or cloud, the server or cloud may be accessed using the wireless modem, communication network associated with the electronic device 120, etc. In one embodiment, the low power management controller 940 is configured for two-way communication with the electronic devices 120. In one embodiment, the low power management controller 940 is configured to communicate with and access data from one or more network servers 950 (e.g., over a public network, such as the Internet).

In one embodiment, the network servers 950 may be servers operated by any of a wide variety of network providers and generally comprise servers that store information about electronic devices that are connected to one another by one or more user interdependencies (e.g., friends, business relationship, family, and the like). Although some of the electronic device information stored by a network server is private, some portion of the information may be public information (e.g., a basic profile of the user that includes a user's name, picture, and general information). Additionally, in some instances, a user's private information may be accessed by using the user's login and password information. The information available from a user's network account may be expansive and may include one or more lists of friends, current location information (e.g., whether the user has "checked in" to a particular locale), etc. Depending on the privacy setting established by the user, at least some of this information may be available publicly. In one embodiment, a user's private or public network information may be searched and accessed by communicating with the network server 950, using an application programming interface ("API") provided by the network operator.

In one embodiment, the low power management controller 940 performs operations associated with a low power management application or method. In one example embodiment, the low power management controller 940 may receive device information from a plurality of electronic devices (or just from one local electronic device), determine relationships between two or more of the electronic devices, and transmit low power information to one or more electronic devices or low power management services based on the determined relationships.

In one embodiment, the low power management controller 940 need not be implemented by a remote server, as any one or more of the operations performed by the low power management controller 940 may be performed in another distributed computing environment (e.g., a cloud computing environment).

Figure 9:
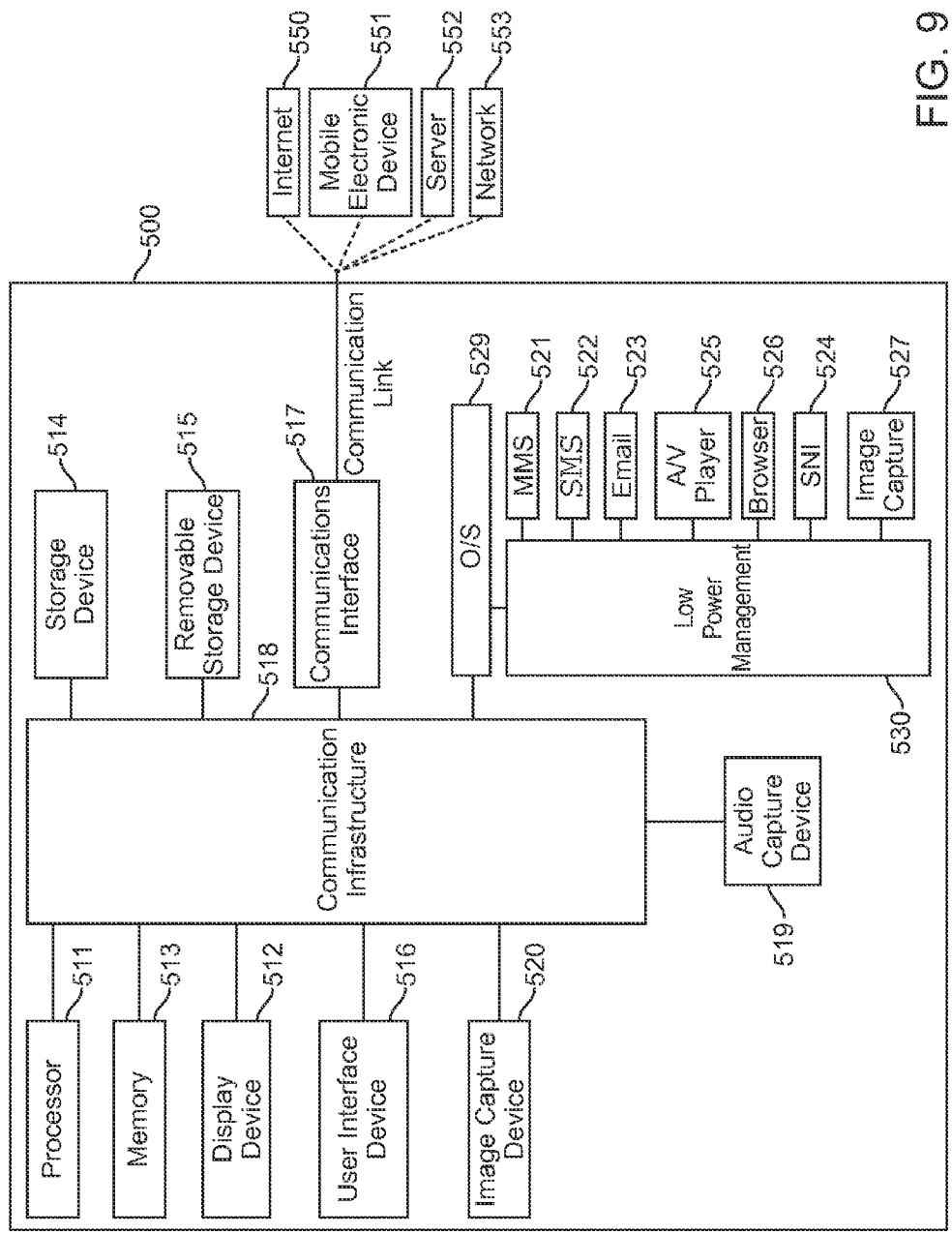
FIG. 9 is a high-level block diagram showing an information processing system comprising a computing system implementing an embodiment.

FIG. 9 is a high-level block diagram showing an information processing system comprising a computing system 500 implementing an embodiment. The system 500 includes one or more processors 511 (e.g., ASIC, CPU, etc.), and can further include an electronic display device 512 (for displaying graphics, text, and other data), a main memory 513 (e.g., random access memory (RAM)), storage device 514 (e.g., hard disk drive), removable storage device 515 (e.g., removable storage drive, removable memory module, a magnetic tape drive, optical disk drive, computer-readable medium having stored therein computer software and/or data), user interface device 516 (e.g., keyboard, touch screen, keypad, pointing device), and a communication interface 517 (e.g., modem, wireless transceiver (such as WiFi, Cellular), a network interface (such as an Ethernet card), a communications port, or a PCMCIA slot and card). The communication interface 517 allows software and data to be transferred between the computer system and external devices through the Internet 550, mobile electronic device 551, a server 552, a network 553, etc. The system 500 further includes a communications infrastructure 518 (e.g., a communications bus, cross-over bar, or network) to which the aforementioned devices/modules 511 through 517 are connected.

The information transferred via communications interface 517 may be in the form of signals such as electronic, electromagnetic, optical, or other signals capable of being received by communications interface 517, via a communication link that carries signals and may be implemented using wire or cable, fiber optics, a phone line, a cellular phone link, an radio frequency (RF) link, and/or other communication channels.

In one implementation of an embodiment in a mobile wireless device such as a mobile phone, the system 500 further includes an audio capture device 519 such as audio output 123, and an image capture device 520 such as a camera 15. The system 500 may further include application modules as MMS module 521, SMS module 522, email module 523, social network interface (SNI) module 524, audio/video (AV) player 525, web browser 526, image capture module 527, etc.

The system 500 further includes a low power management module 530, according to an embodiment. In one implementation of said low power management module 530 along an operating system 529 may be implemented as executable code residing in a memory of the system 500. In another embodiment, such modules are in firmware, etc.

One or more embodiments may use features of WebRTC for acquiring and communicating streaming data. In one embodiment, the use of WebRTC implements one or more of the following APIs: MediaStream (e.g., to get access to data streams, such as from the user's camera and microphone), RTCPeerConnection (e.g., audio or video calling, with facilities for encryption and bandwidth management), RTCDataChannel (e.g., for peer-to-peer communication of generic data), etc.

In one embodiment, the MediaStream API represents synchronized streams of media. For example, a stream taken from camera and microphone input may have synchronized video and audio tracks. One or more embodiments may implement an RTCPeerConnection API to communicate streaming data between browsers (e.g., peers), but also use signaling (e.g., messaging protocol, such as SIP or XMPP, and any appropriate duplex (two-way) communication channel) to coordinate communication and to send control messages. In one embodiment, signaling is used to exchange three types of information: session control messages (e.g., to initialize or close communication and report errors), network configuration (e.g., a computer's IP address and port information), and media capabilities (e.g., what codecs and resolutions may be handled by the browser and the browser it wants to communicate with).

In one embodiment, the RTCPeerConnection API is the WebRTC component that handles stable and efficient communication of streaming data between peers. In one embodiment, an implementation establishes a channel for communication using an API, such as by the following processes: client A generates a unique ID, Client A requests a Channel token from the App Engine app, passing its ID, App Engine app requests a channel and a token for the client's ID from the Channel API, App sends the token to Client A, Client A opens a socket and listens on the channel set up on the server. In one embodiment, an implementation sends a message by the following processes: Client B makes a POST request to the App Engine app with an update, the App Engine app passes a request to the channel, the channel carries a message to Client A, and Client A's on message callback is called.

In one embodiment, WebRTC may be implemented for a one-to-one communication, or with multiple peers each communicating with each other directly, peer-to-peer, or via a centralized server. In one embodiment, Gateway servers may enable a WebRTC app running on a browser to interact with electronic devices.

In one embodiment, the RTCDataChannel API is implemented to enable peer-to-peer exchange of arbitrary data, with low latency and high throughput. In one or more embodiments, WebRTC may be used for leveraging of RTCPeerConnection API session setup, multiple simultaneous channels, with prioritization, reliable and unreliable delivery semantics, built-in security (DTLS), and congestion control, and ability to use with or without audio or video.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the one or more embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of the one or more embodiments.

Though the one or more embodiments have been described with reference to certain versions thereof; however, other versions are possible. Therefore, the spirit and scope of the appended claims should not be limited to the description of the preferred versions contained herein.

What is claimed is:

1. A method for power management comprising:
   registering and subscribing a first endpoint device in a local network with a remote power management service;
   receiving, at the remote power management service, power state information of the first endpoint device;
   determining, at the remote power management service, at least one user interdependency relationship between the first endpoint device and at least one other electronic device connected to the local network by accessing one or more servers maintaining profile information of one or more users of the first endpoint device and the at least one other electronic device;
   transmitting, from the remote power management service, the power state information to the at least one other electronic device based on the at least one user interdependency relationship determined, wherein the at least one other electronic device is configured to locate the first endpoint device and change a power state of the first endpoint device based on the power state information; and
   receiving, at the remote power management service, a notification of a change of the power state from the first endpoint device via an Universal Plug and Play (UPnP) eventing mechanism.

2. The method of claim 1, wherein:
   the remote power management service is discoverable by the first endpoint device; and
   the at least one user interdependency relationship determined comprises at least one of a friend relationship, a business relationship, and a family relationship.

3. The method of claim 1, wherein:
   the at least one other electronic device comprises one of a second endpoint device in the local network or a remote electronic device connected to the local network;
   the at least one other electronic device is informed about availability of the first endpoint device in the local network based on the power state information; and
   the at least one other electronic device is configured to wake up the first endpoint device from a low power state to an active state based on the power state information.

4. The method of claim 2, wherein the remote power management service is discoverable by the first endpoint device via at least one of the following:
   a link to the remote power management service the first endpoint device is statically configured with;
   an advertisement of the remote power management service on the local network; and
   a wide area service discovery mechanism invoked by the first endpoint device.

5. The method of claim 1, further comprising:
   discovering, at the remote power management service, the first endpoint device, wherein the first endpoint device is advertised to the remote power management service.

6. The method of claim 1, wherein receiving, at the remote power management service, power state information of the first endpoint device comprises at least one of:
   receiving a notification of the power state information from the first endpoint device;
   retrieving the power state information from the first endpoint device using an action; and
   receiving the power state information from a control point connected to the local network.

7. The method of claim 6, wherein the notification of the power state information from the first endpoint device is received via an UPnP eventing mechanism.

8. The method of claim 1, wherein the remote power management service comprises a cloud-based service, and the power state information is pulled from the local network or pushed to a cloud network.

9. The method of claim 1, wherein the first endpoint device is a home network device, and a change in the power state of the first endpoint device occurs without a local network proxy device.

10. The method of claim 1, wherein the first endpoint device is a mobile electronic device.

11. The method of claim 10, wherein the mobile electronic device comprises a mobile phone, a tablet device, or a mobile computing device.

12. A server comprising:
    at least one processor; and
    a non-transitory processor-readable memory device storing instructions that when executed by the at least one processor causes the at least one processor to perform operations including:
       registering and subscribing a first endpoint device in a local network;
       receiving power state information of the first endpoint device;
       determining at least one user interdependency relationship between the first endpoint device and at least one other electronic device connected to the local network by accessing one or more servers maintaining profile information of one or more users of the first endpoint device and the at least one other electronic device;

transmitting the power state information to the at least one other electronic device based on the at least one user interdependency relationship determined, wherein the at least one other electronic device is configured to locate the first endpoint device and change a power state of the first endpoint device based on the power state information; and receiving a notification of a change of the power state from the first endpoint device via an Universal Plug and Play (UPnP) eventing mechanism.

13. The server of claim 12, wherein:
the at least one user interdependency relationship determined comprises at least one of a friend relationship, a business relationship, and a family relationship;
the at least one other electronic device comprises one of a second endpoint device in the local network or a remote electronic device connected to the local network;
the at least one other electronic device is informed about availability of the first endpoint device in the local network based on the power state information; and
the at least one other electronic device is configured to wake up the first endpoint device from a low power state to an active state based on the power state information.

14. The server of claim 12, wherein the server is discoverable by the first endpoint device via at least one of the following:
a link to the server the first endpoint device is statically configured with;
an advertisement of the server on the local network; and
a wide area service discovery mechanism invoked by the first endpoint device.

15. The server of claim 12, wherein the operations further comprise:
discovering the first endpoint device, wherein the first endpoint device is advertised to the server.

16. The server of claim 12, wherein receiving power state information of the first endpoint device comprises at least one of:
receiving a notification of the power state information from the first endpoint device;
retrieving the power state information from the first endpoint device using an action; and
receiving the power state information from a control point connected to the local network.

17. The server of claim 16, wherein the notification of the power state information from the first endpoint device is received via an UPnP eventing mechanism.

18. The server of claim 12, wherein the server provides a cloud-based service.

19. The server of claim 18, wherein the power state information is pulled from the local network or pushed to a cloud network.

20. The server of claim 12, wherein the first endpoint device is a home network device, and a change in the power state of the first endpoint device occurs without a local network proxy device.

21. The server of claim 12, wherein the first endpoint device comprises a mobile phone, a tablet device, or a mobile computing device.

22. A non-transitory processor-readable medium that includes a program that when executed by a processor performs a method comprising:
registering and subscribing a first endpoint device in a local network with a remote power management service;
receiving, at the remote power management service, power state information of the first endpoint device;
determining, at the remote power management service, at least one user interdependency relationship between the first endpoint device and at least one other electronic device connected to the local network by accessing one or more servers maintaining profile information of one or more users of the first endpoint device and the at least one other electronic device;
transmitting, from the remote power management service, the power state information to the at least one other electronic device based on the at least one user interdependency relationship determined, wherein the at least one other electronic device is configured to locate the first endpoint device and change a power state of the first endpoint device based on the power state information; and
receiving, at the remote power management service, a notification of a change of the power state from the first endpoint device via an Universal Plug and Play (UPnP) eventing mechanism.

23. The non-transitory processor-readable medium of claim 22, wherein:
the at least one user interdependency relationship determined comprises at least one of a friend relationship, a business relationship, and a family relationship;
the at least one other electronic device comprises one of a second endpoint device in the local network or a remote electronic device connected to the local network;
the at least one other electronic device is informed about availability of the first endpoint device in the local network based on the power state information; and
the at least one other electronic device is configured to wake up the first endpoint device from a low power state to an active state based on the power state information.

24. The non-transitory processor-readable medium of claim 22, wherein the remote power management service is discoverable by the first endpoint device via at least one of the following:
a link to the remote power management service the first endpoint device is statically configured with;
an advertisement of the remote power management service on the local network; and
a wide area service discovery mechanism invoked by the first endpoint device.

25. The non-transitory processor-readable medium of claim 22, wherein the method further comprises:
discovering, at the remote power management service, the first endpoint device, wherein the first endpoint device is advertised to the remote power management service.

26. The non-transitory processor-readable medium of claim 22, wherein receiving, at the remote power management service, power state information of the first endpoint device comprises at least one of:
receiving a notification of the power state information from the first endpoint device;
retrieving the power state information from the first endpoint device using an action; and
receiving the power state information from a control point connected to the local network.

27. The non-transitory processor-readable medium of claim 26, wherein the notification of the power state information from the first endpoint device is received via an UPnP eventing mechanism.

28. The non-transitory processor-readable medium of claim 22, wherein the remote power management service comprises a cloud-based service, and the power state information is pulled from the local network or pushed to a cloud network.

29. The non-transitory processor-readable medium of claim 22, wherein the first endpoint device is a home network device, and a change in the power state of the first endpoint device occurs without a local network proxy device.

30. The non-transitory processor-readable medium of claim 22, wherein the first endpoint device comprises a mobile phone, a tablet device, or a mobile computing device.

* * * * *